United States Patent
Morino et al.

(10) Patent No.: US 11,079,802 B1
(45) Date of Patent: Aug. 3, 2021

(54) ELECTRONIC APPARATUS HAVING A SUB DISPLAY

(71) Applicant: LENOVO (SINGAPORE) PTE. LTD., Singapore (SG)

(72) Inventors: Takayuki Morino, Kanagawa (JP); Masayuki Amano, Kanagawa (JP); Seita Horikoshi, Kanagawa (JP); Satoshi Seino, Tokyo (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/925,250

(22) Filed: Jul. 9, 2020

(51) Int. Cl.
*G06F 1/16* (2006.01)

(52) U.S. Cl.
CPC ............ *G06F 1/165* (2013.01); *G06F 1/1616* (2013.01); *G06F 1/1656* (2013.01); *G06F 1/1681* (2013.01)

(58) Field of Classification Search
CPC ....... G06F 1/203; G06F 1/1656; G06F 1/1681
See application file for complete search history.

(56) References Cited

U.S. PATENT DOCUMENTS

| | | | |
|---|---|---|---|
| 5,168,427 A | 12/1992 | Clancy et al. | |
| 7,874,044 B1* | 1/2011 | Huang | G06F 1/1681 16/286 |
| 7,894,184 B2* | 2/2011 | Huang | G06F 1/1616 361/679.48 |
| 9,501,097 B2* | 11/2016 | Moser | G06F 1/1649 |
| 9,778,684 B2* | 10/2017 | Senatori | G06F 1/162 |
| 10,078,351 B1 | 9/2018 | Chang et al. | |
| 10,289,176 B1* | 5/2019 | Chen | G06F 1/1656 |
| 10,520,990 B2* | 12/2019 | Chen | G06F 1/203 |
| 10,534,408 B2* | 1/2020 | Cheng | G06F 1/1616 |
| 10,627,874 B2* | 4/2020 | Lin | G06F 1/1681 |
| 10,936,015 B2* | 3/2021 | Liu | G06F 1/1616 |
| 2020/0233459 A1* | 7/2020 | Sanchez | E05D 3/12 |

FOREIGN PATENT DOCUMENTS

| | | | |
|---|---|---|---|
| JP | 09091058 A | 4/1997 | |
| JP | 2003336621 A | 11/2003 | |
| JP | 2004310238 A | 11/2004 | |
| JP | 2011187034 A | 9/2011 | |
| JP | 2016134051 A | 7/2016 | |

* cited by examiner

*Primary Examiner* — Anthony Q Edwards
(74) *Attorney, Agent, or Firm* — Antony P. Ng; Russell Ng PLLC

(57) ABSTRACT

An electronic apparatus having a sub display is provided. The electronic apparatus includes a hinge mechanism connecting a main body chassis and a display chassis; a movable plate provided on a top surface of the main body chassis and is turnable in a direction in which its rear end moves up and down around a rotating shaft part provided at its front end; a drive mechanism that turns the movable plate in conjunction with a turning operation between the main body chassis and the display chassis by the hinge mechanism; and a release mechanism that releases an interlocking state of the turning operation and the movable plate by the drive mechanism to allow the movable plate to turn in a downward direction when the movable plate of which the rear end is located at a raised position receives a predetermined external force in the downward direction.

11 Claims, 12 Drawing Sheets

FIG. 2C

ELECTRONIC APPARATUS HAVING A SUB DISPLAY

PRIORITY CLAIM

The present application claims benefit of priority under 35 U.S.C. §§ 120, 365 to the previously filed Japanese Patent Application No. JP2019-129142 with a priority date of Jul. 11, 2019, which is incorporated by reference herein.

TECHNICAL FIELD

The present invention relates to electronic apparatuses in general, and in particular to an electronic apparatus having a sub display.

BACKGROUND

An electronic apparatus, such as a laptop PC, generally includes a main body chassis having a keyboard and a display chassis having a display, and the main body chassis is connected to the display chassis by a hinge mechanism. In this type of electronic apparatus, it is desirable that a display (main display) can perform work by largely using its display surface at a maximum. The electronic apparatus may also include a sub display provided on a main body chassis. This sub display can be made display a tab, a thumbnail of each application, etc. that cannot be displayed by the main display.

Commonly, a sub display as described above does not have a specific size like a main display. For this reason, it is also considered to provide a small-sized sub display at the rear of a keyboard on the top surface of a main body chassis, for example. However, considering thinness and interference when the display chassis is closed on top of the main body chassis in such a configuration, the sub display needs to be arranged along the top surface of the main body chassis. By doing so, the small-sized sub display is installed at the back of the top of the main body chassis in a planar shape, and it is not convenient. On the other hand, the sub display is supposed to be used by touch operations, and thus it is necessary not to cause a damage and a trouble when an excessive load is received.

Consequently, it would be desirable to provide an improved electronic apparatus having an sub display.

SUMMARY

In accordance with an embodiment of the present disclosure, an electronic apparatus includes a first chassis; a second chassis; a hinge mechanism that connects the first chassis and the second chassis; a movable plate that is provided on a top surface of the first chassis and is turnable in a direction in which its rear end moves up and down around a rotating shaft part provided at its front end; a drive mechanism that turns the movable plate in conjunction with a turning operation between the first chassis and the second chassis by the hinge mechanism; and a release mechanism that releases an interlocking state of the turning operation and the movable plate by the drive mechanism to allow the movable plate to turn in a downward direction when the movable plate of which the rear end is located at a raised position receives a predetermined external force in the downward direction.

With the above-mentioned configuration, the movable plate operates in conjunction with the turning operation of the second chassis by the drive mechanism, and its rear end moves up and down. As a result, a user opens the second chassis and only sets a keyboard and a display to be usable when using this electronic apparatus, and the movable plate is automatically opened in a front-down tilted posture.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 2C is a side view illustrating a state there the display chassis from FIG. 2B is at a 180-degree position;

DETAILED DESCRIPTION

Figure 1:
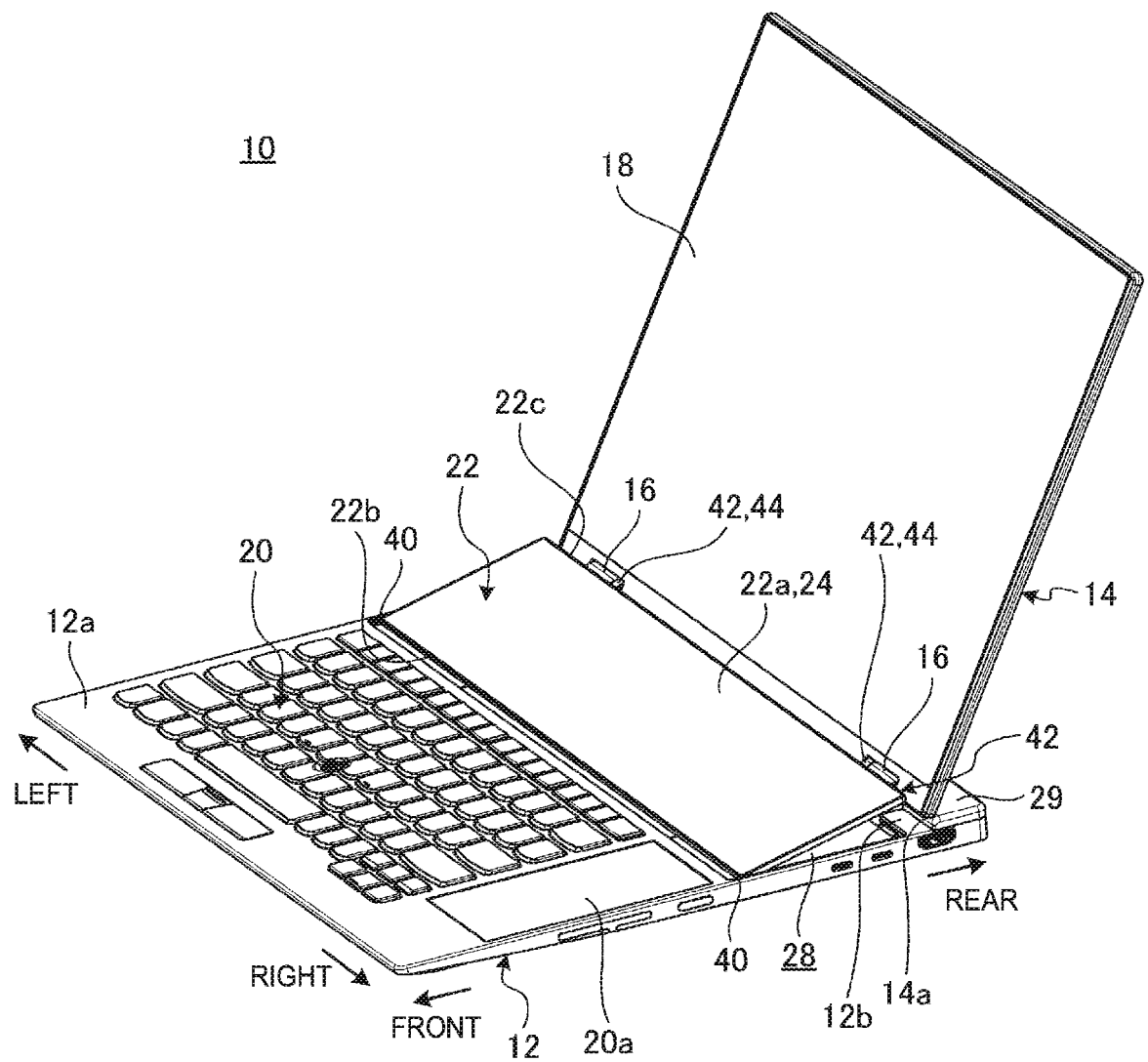
FIG. 1 is a perspective view of an electronic apparatus, according to one embodiment.

FIG. 1 is a perspective view illustrating an electronic apparatus 10, according to one embodiment. As illustrated in FIG. 1, the electronic apparatus 10 is a laptop PC in which a main body chassis 12 and a display chassis 14 are turnably connected by a left-and-right pair of hinge mechanisms 16 and 16.

Hereinafter, the electronic apparatus 10 will be described, assuming that a near side is the front, a far side is the rear, a thickness direction of the main body chassis 12 is the up and down, and its width direction is the left and right, in a direction viewed from a user who operates a keyboard 20 while visually recognizing a display 18 using as a reference a state where the display chassis 14 is opened from the main body chassis 12 to use the electronic apparatus as illustrated in FIG. 1.

The display chassis 14 is a thin box-shaped chassis and includes the display 18 composed of a liquid crystal display, for example. The display 18 is a main display of the electronic apparatus 10.

The main body chassis 12 is a thin box-shaped chassis having a larger thickness compared to the display chassis 14. A board, a CPU, a memory, a battery device, and the like not illustrated are stored inside the main body chassis 12. The keyboard 20 and a movable plate 22 are provided on a top surface 12a of the main body chassis 12. The keyboard 20 may be a software type in which key tops are displayed on a touch-panel display not illustrated, instead of a mechanical type in which the key tops are moved up and down as illustrated in FIG. 1. The reference number 20a in FIG. 1 is, for example, a numeric keypad or a touch pad constituting a part of the keyboard 20. The numeric keypad (touch pad) 20a may be omitted. The movable plate 22 is a plate-shaped member that is provided side by side at the rear of the keyboard 20 and is turnably provided with respect to the main body chassis 12. The movable plate 22 according to the present embodiment is configured to include a sub display 24 on its top surface and to also function as an opening lid of a ventilation port 26 (see FIG. 3) provided further below. The details will be described later.

The main body chassis 12 according to the present embodiment includes a step portion 12b in the rear of the movable plate 22 on the top surface 12a. The hinge mechanisms 16 are provided on the step portion 12b and connects the main body chassis 12 and a bottom end 14a of the display chassis 14.

Figure 2A:
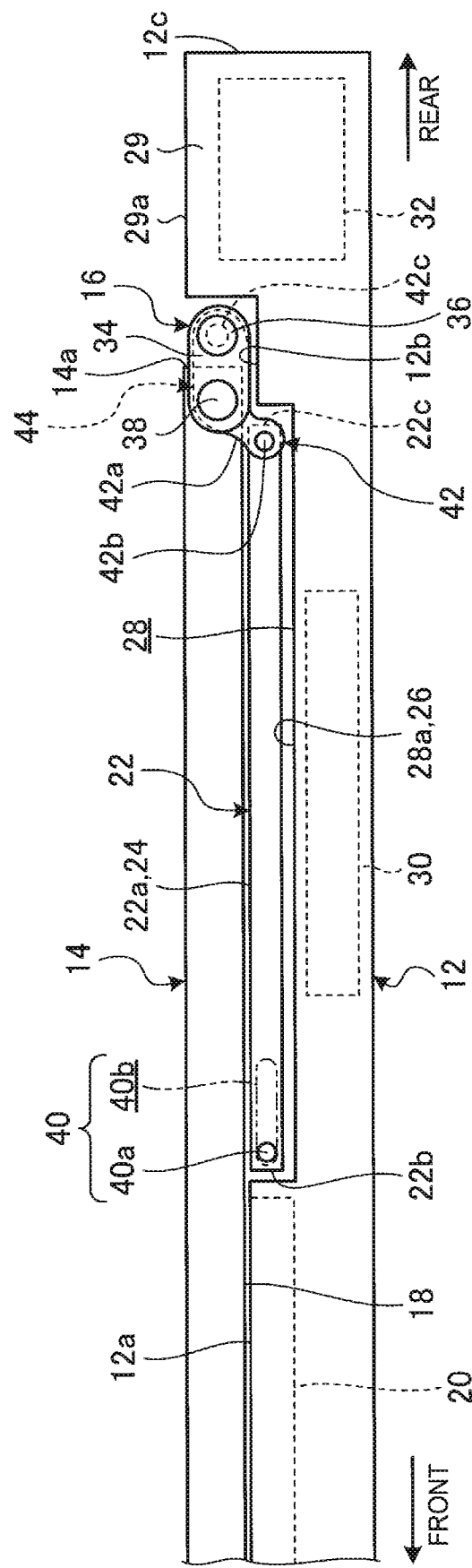
FIG. 2A is a side view illustrating a state where a display chassis of the electronic apparatus from FIG. 1 is at a 0-degree position.
Figure 2B:
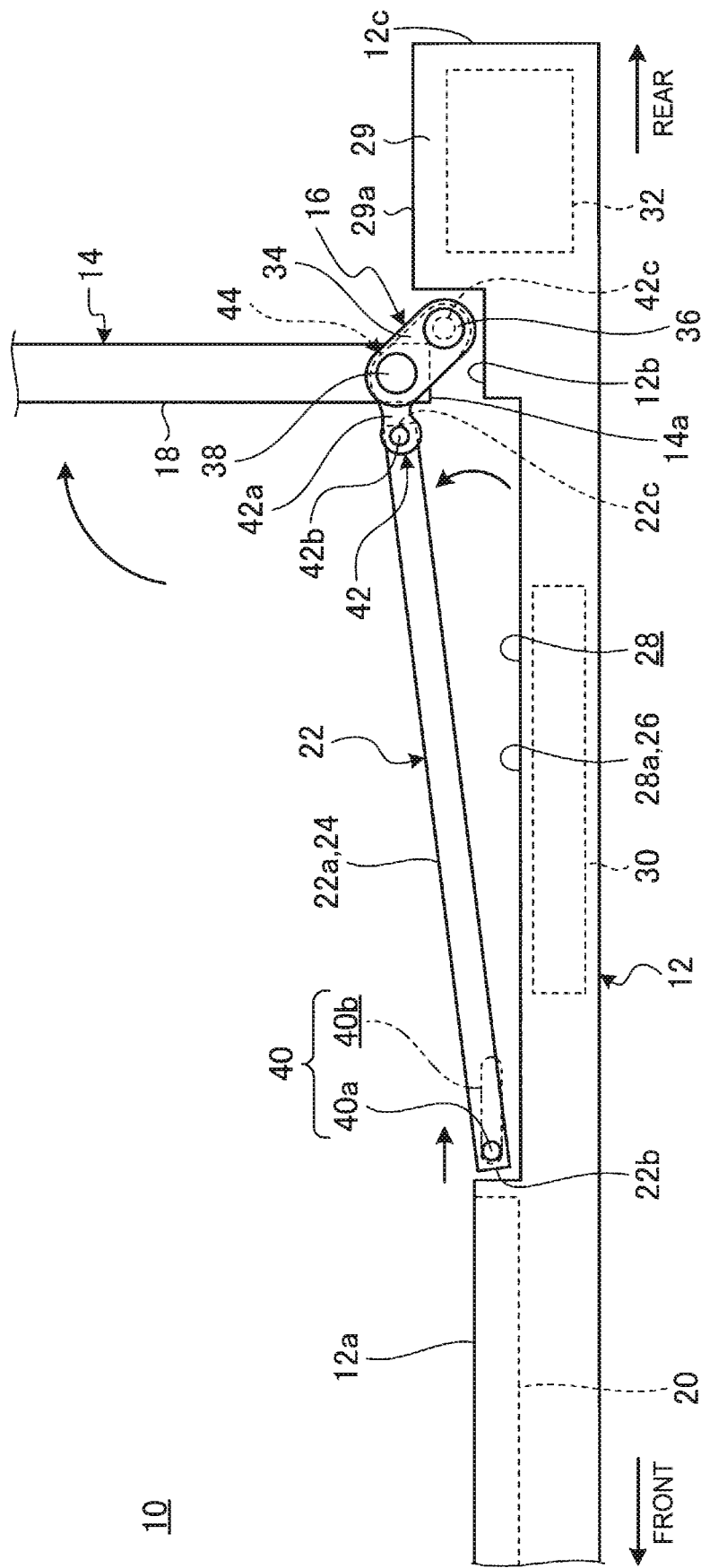
FIG. 2B is a side view illustrating a state where the display chassis from FIG. 2A is at a 90-degree position.
Figure 2C:
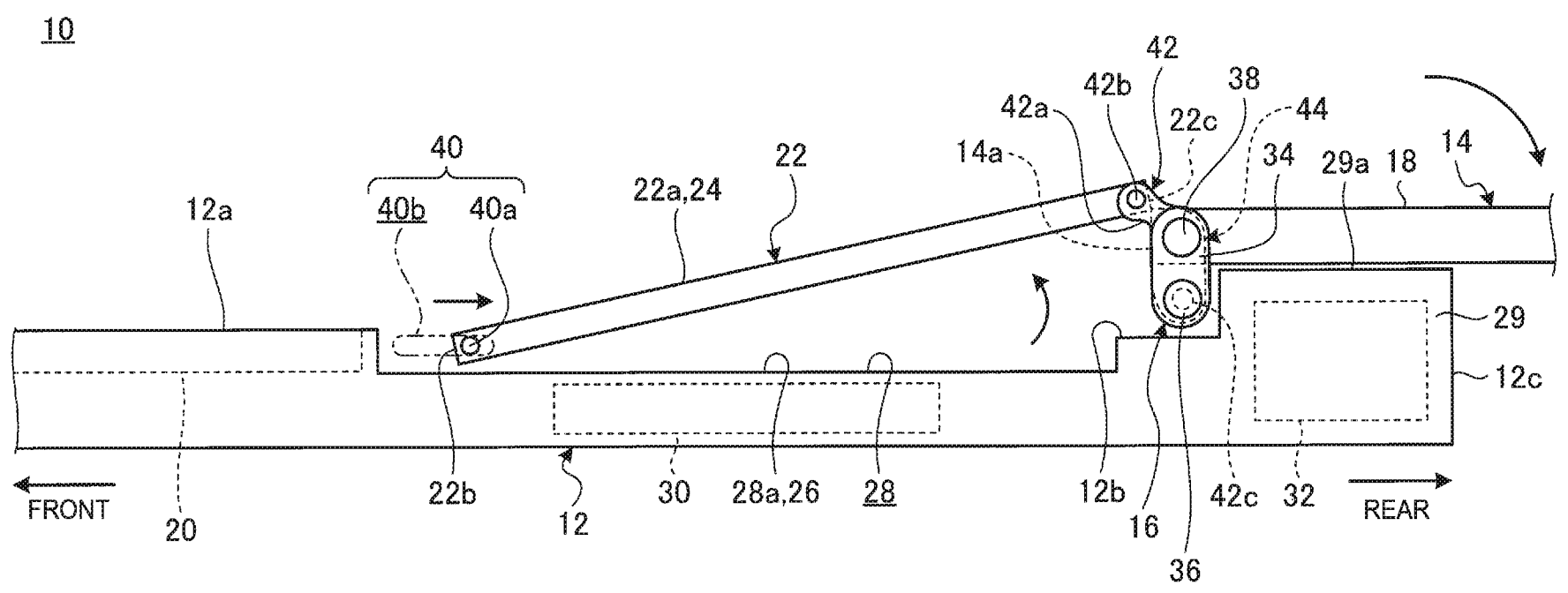
Figure 2D:
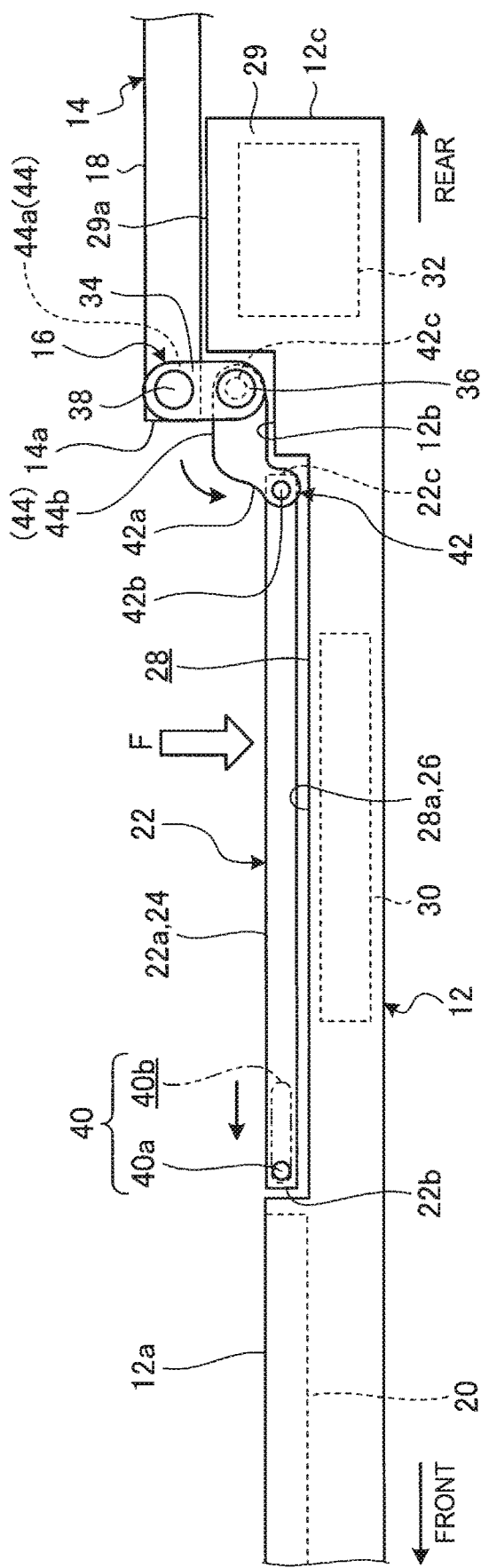
FIG. 2D is a side view illustrating a state where a movable plate is forcibly pushed down by an external force from the state illustrated in FIG. 2C.
Figure 3:
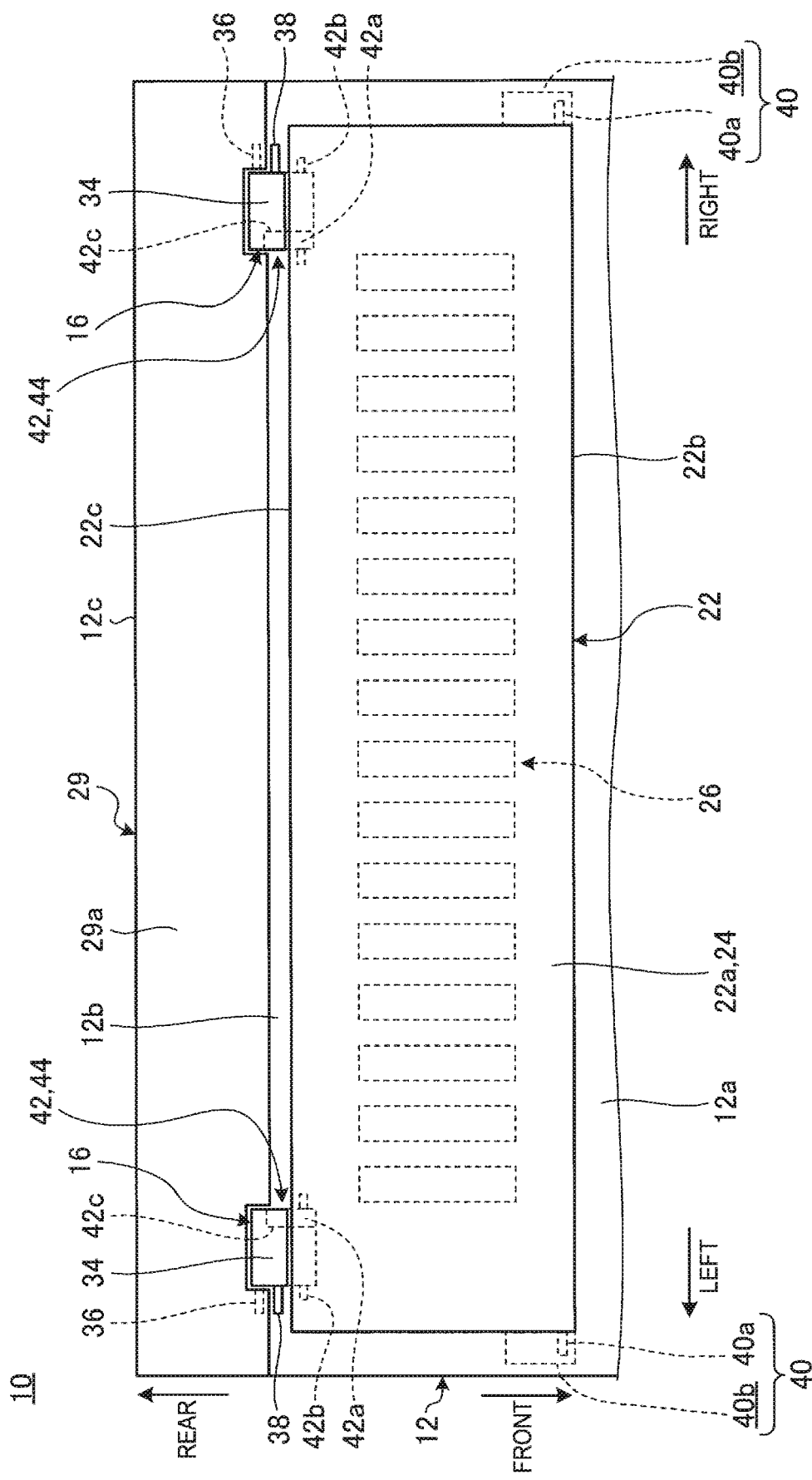
FIG. 3 is a plan view illustrating the movable plate and its peripherals of the electronic apparatus from FIG. 1.

FIGS. 2A to 2C are side views schematically illustrating an opening/closing operation of the display chassis 14 and the movable plate 22 with respect to the main body chassis 12 of the electronic apparatus 10 as illustrated in FIG. 1. FIG. 2D is a side view illustrating a state where the movable plate 22 is forcibly pushed down by an external force F from the state illustrated in FIG. 2C. FIG. 3 is a schematic plan view illustrating the movable plate 22 and its peripherals of the electronic apparatus 10 illustrated in FIG. 1. FIGS. 2A to 2D omit the illustration such as hatching illustrating a cross section to ensure the legibility of the drawings. FIG. 3 is a plan view illustrating a state where the display chassis 14 is closed as illustrated in FIG. 2A, but omits the illustration of the display chassis 14.

As illustrated in FIGS. 2A to 3, a recessed portion for storage 28 and the step portion 12b are sequentially provided at the rear of the keyboard 20 on the top surface 112a of the main body chassis 12. Furthermore, the main body chassis 12 includes an extension portion 29 provided to protrude rearward of the hinge mechanism 16 at the rear of the step portion 12b. The present embodiment may have a configuration that the main body chassis does not include the extension portion 29.

The recessed portion for storage 28 is a shallow bathtub-shaped recessed portion formed by concaving a part of the top surface 12a, and can store the movable plate 22 located at a closed position as illustrated in FIG. 2A. In a state where the movable plate 22 is stored in the recessed portion for storage 28, a top surface 22a (sub display 24) of the movable plate 22 is flush with or slightly lower than the top surface 12a of the main body chassis 12.

In the main body chassis 12, a blower fan 30 is provided below the recessed portion for storage 28 and a fin 32 is provided in the extension portion 29. The fin 32 is connected to a heating element such as the CPU via a heat pipe not illustrated, for example. The blower fan 30 sucks outside air into the main body chassis 12 via the ventilation port 26 formed on a top surface 28a of the recessed portion for storage 28, and discharges it to the outside from an exhaust port (not illustrated) provided on a rear surface 12c of the main body chassis 12 via the fin 32. The ventilation port 26 has a configuration that slits extending in front and rear as illustrated by a broken line of FIG. 3 are arranged to the left, for example.

As illustrated in FIGS. 2A to 3, each of the hinge mechanisms 16 includes a hinge chassis 34, a main body shaft 36, and a display shaft 38. In FIG. 3, the left and right hinge mechanisms 16 illustrate a symmetric structure, but the left and right hinge mechanisms 16 may have the same structure.

The hinge chassis 34 is a rectangular tubular member provided to extend between the main body chassis 12 and the display chassis 14. The main body shaft 36 is a shaft that relatively rotatably connects the main body chassis 12 and the hinge chassis 34. One end of the main body shaft 36 is unrotatably connected to the main body chassis 12 and the other end is rotatably supported by the hinge chassis 34. Alternatively, one end of the main body shaft 36 may be rotatably supported by the main body chassis 12 and the other end may be unrotatably connected to the hinge chassis 34. The display shaft 38 is a shaft that relatively rotatably connects the display chassis 14 and the hinge chassis 34. One end of the display shaft 38 is unrotatably connected to the display chassis 14 and the other end is rotatably supported by the hinge chassis 34. Alternatively, one end of the display shaft 38 may be rotatably supported by the display chassis 14 and the other end may be unrotatably connected to the hinge chassis 34.

As described above, each of the hinge mechanisms 16 is a bi-axial structure having the main body shaft 36 and the display shaft 38 that are two hinge shafts. In each of the hinge mechanisms 16, the main body shaft 36 and the display shaft 38 are synchronously rotated via a gear mechanism not illustrated. In other words, a turning angle of the display chassis 14 is a total value of rotation angles of the main body shaft 36 and the display shaft 38. For this reason, the hinge chassis 34 is turned by the half of the turning angle of the display chassis 14. Specifically, when the display chassis 14 is turned from a 0-degree position illustrated in FIG. 2A to a 90-degree position illustrated in FIG. 2B; the hinge chassis 34 is turned from the 0-degree position to a 45-degree position.

The main body shaft 36 is connected to the main body chassis 12 at the step portion 12b and is arranged below a top surface 29a of the extension portion 29. Along with the turning operation of the hinge chassis 34, the display shaft 38 moves from a position (see FIG. 2A) below the top surface 29a to a position (see FIGS. 2B and 2C) above the top surface 29a.

Therefore, the hinge mechanism 16 has a 0-degree posture in which the shafts 36 and 38 are arranged in the front-and-rear direction and the hinge chassis 34 is stored in the step portion 12*b* when the display chassis 14 is at a 0-degree position (see FIG. 2A). In the hinge mechanism 16, because the shafts 36 and 38 are arranged in a posture where they are inclined. 45 degrees with respect to the up-and-down direction when the display chassis 14 is at a 90-degree position (see FIG. 2B), the hinge chassis 34 has a 45-degree posture and the display shaft 38 protrudes above the top surface 29*a*. In the hinge mechanism 16, because the shafts 36 and 38 are arranged in the up-and-down direction when the display chassis 14 is at a 180-degree position (see FIG. 2C), the hinge chassis 34 stands up in a 90-degree posture. For this reason, at the 180-degree position, the display shaft 38 is located completely above the top surface 29*a* and the display chassis 14 is smoothly turned onto the top surface 29*a*. Herein, the expressions of a 0-degree position (0-degree posture), a 90-degree position (45-degree posture), a 180-degree position (90-degree posture), and the like may naturally have angular positions slightly deviated from accurate angular positions indicated by angle numbers due to a structure of the main body chassis 12, the display chassis 14, or the hinge mechanisms 16, but a 0-degree position etc. are referred for description for convenience in the present embodiment.

As illustrated in FIGS. 1 to 3, the movable plate 22 is a plate-shaped member that can turn in a direction in which its rear end 22*c* moves up and down around a rotating shaft part 40 provided in its front end 22*b*. The movable plate 22 includes the sub display 24 on the top surface 22*a*. The sub display 24 is a touch-panel liquid crystal display, for example. The electronic apparatus 10 includes drive mechanisms 42 and release mechanisms 44.

The rotating shaft part 40 connects the front end 22*b* of the movable plate 22 and the main body chassis 12 rotatably and slidably in the front-and-rear direction. The rotating shaft part 40 includes connecting shafts 40*a* that respectively protrude from the left and right sides of the front end 22*b* of the movable plate 22 and slide supports 40*b* that slidably support the connecting shafts 40*a* in the front-and-rear direction. The connecting shafts 40*a* are a pin-shaped member. The slide supports 40*b* are long holes that are respectively formed on the left and right inner wall surfaces of the recessed portion for storage 28 and in which the connecting shafts 40*a* can slide along the front-and-rear direction. The rotating shaft part 40 may have a configuration that the connecting shafts 40*a* are provided at the main body chassis 12 side and the slide supports 40*b* are provided at the movable plate 22 side.

Figure 4A:
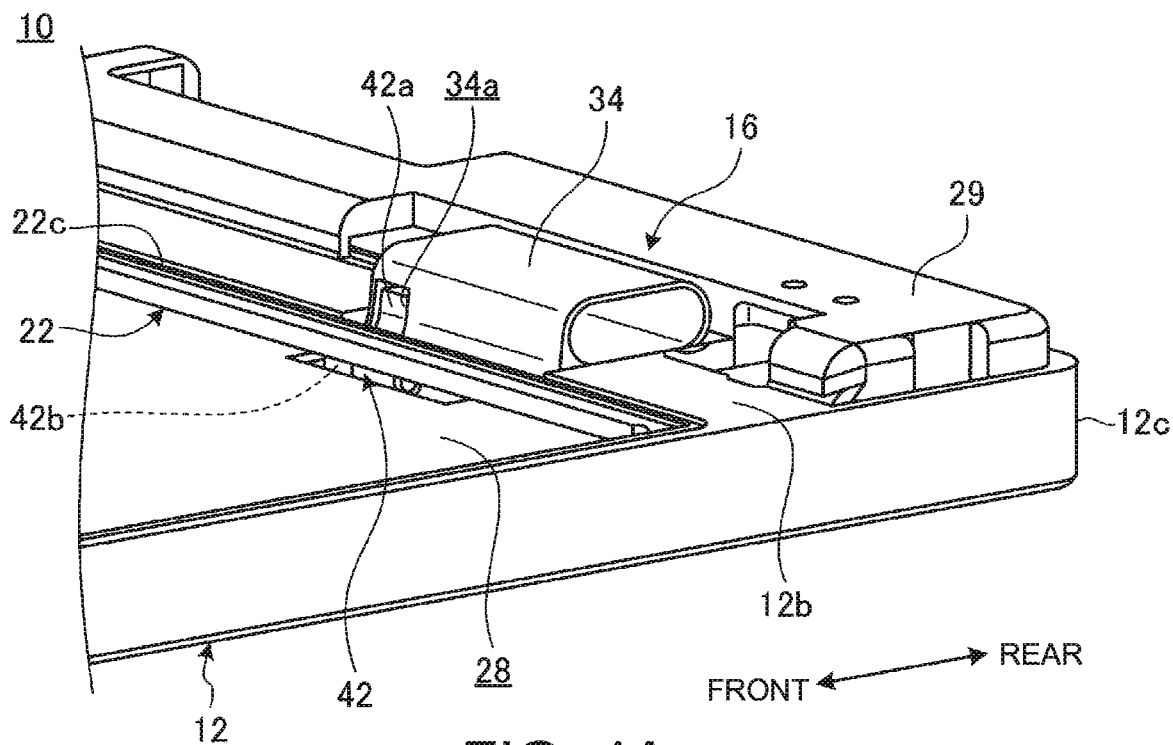
FIG. 4A is an enlarged perspective view illustrating a hinge mechanism and its peripherals in a state where a hinge chassis is in a 0-degree posture.
Figure 4B:
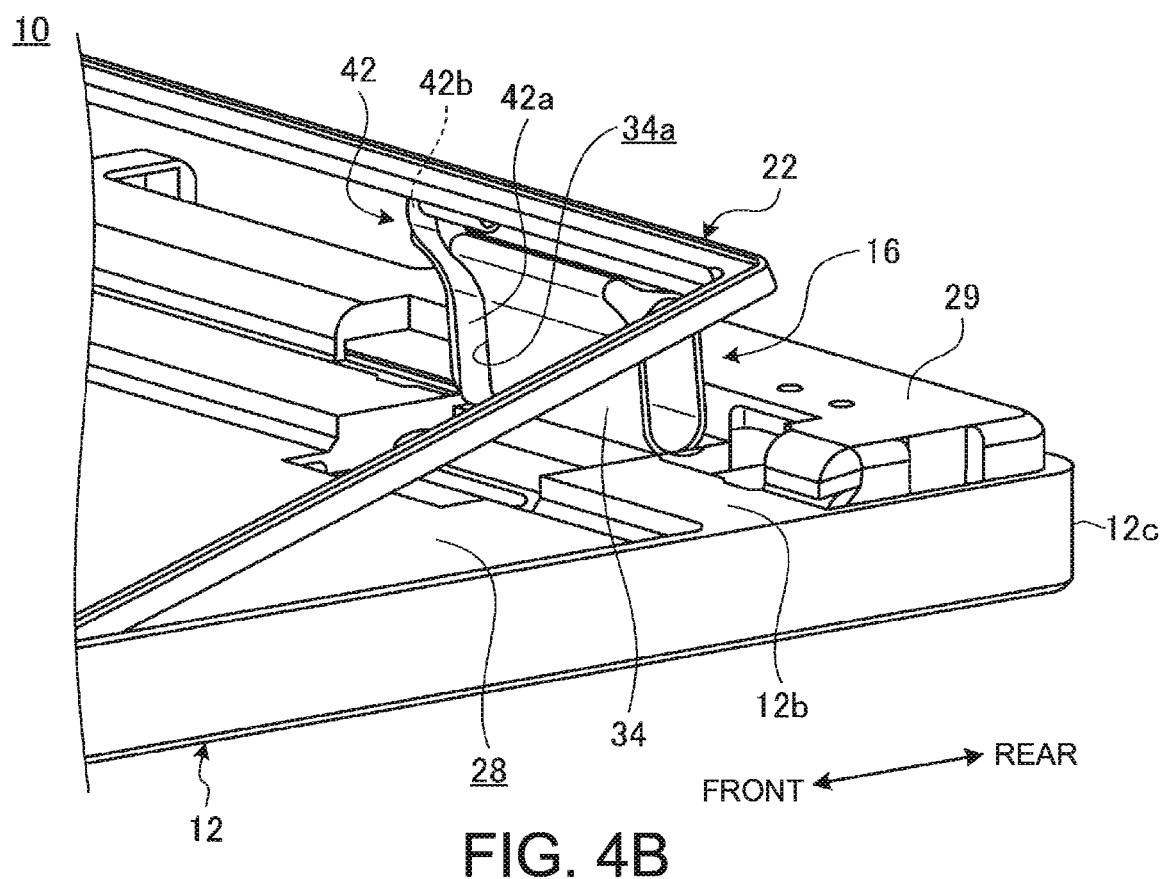
FIG. 4B is a perspective view illustrating a state where the hinge chassis is turned to a 60-degree posture from the state illustrated in FIG. 4A.
Figure 4C:
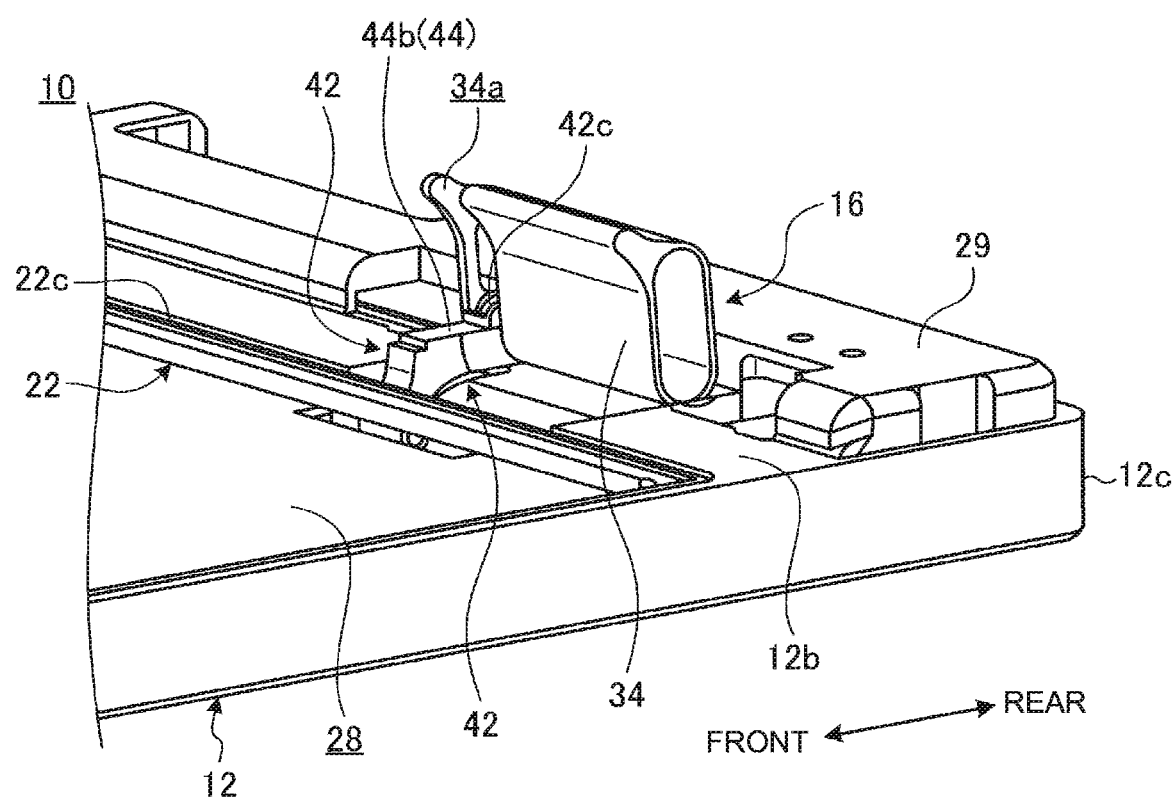
FIG. 4C is a perspective view illustrating a state where the movable plate receives an external force and a release mechanism operates from the state illustrated in FIG. 4B.
Figure 5:
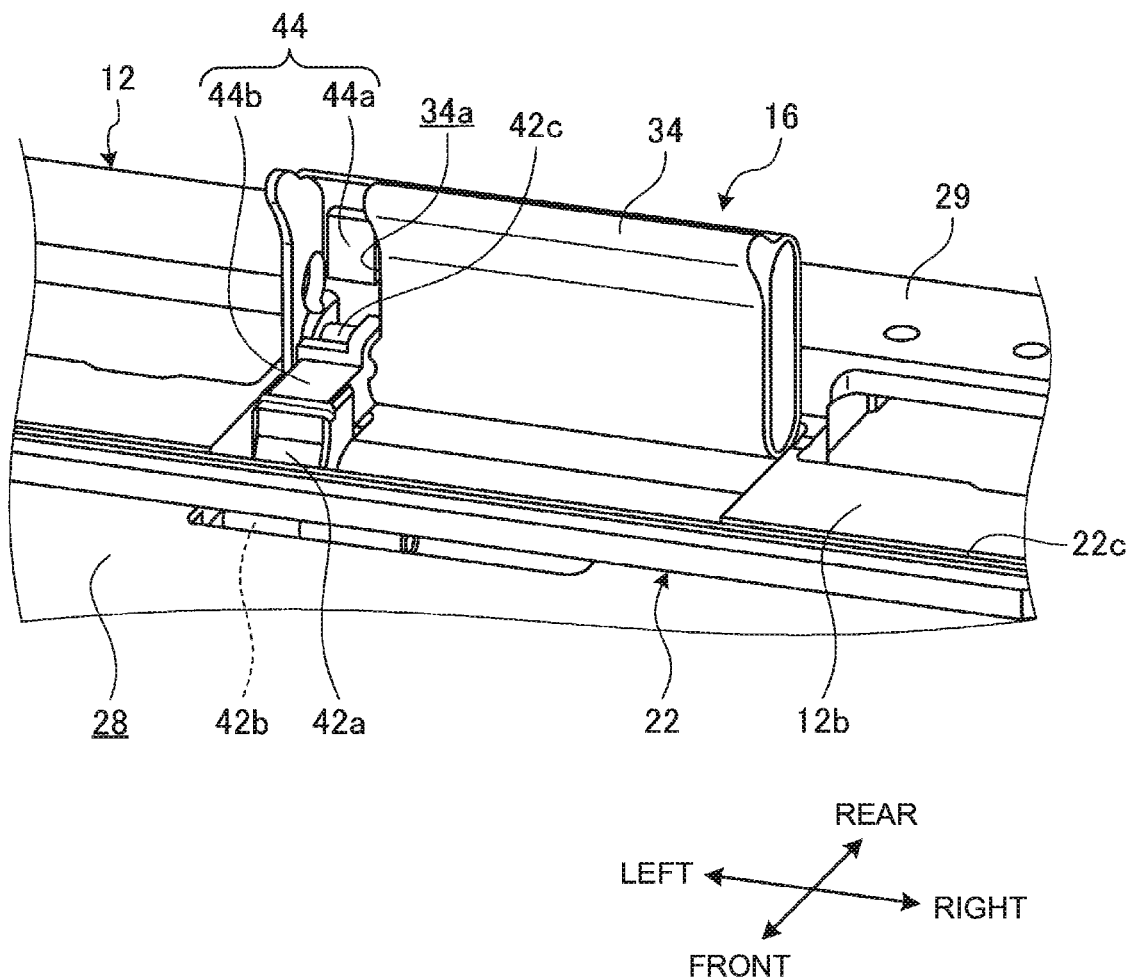
FIG. 5 is a perspective view illustrating the hinge chassis and its peripherals illustrated in FIG. 4C viewed from another angle.
Figure 6A:
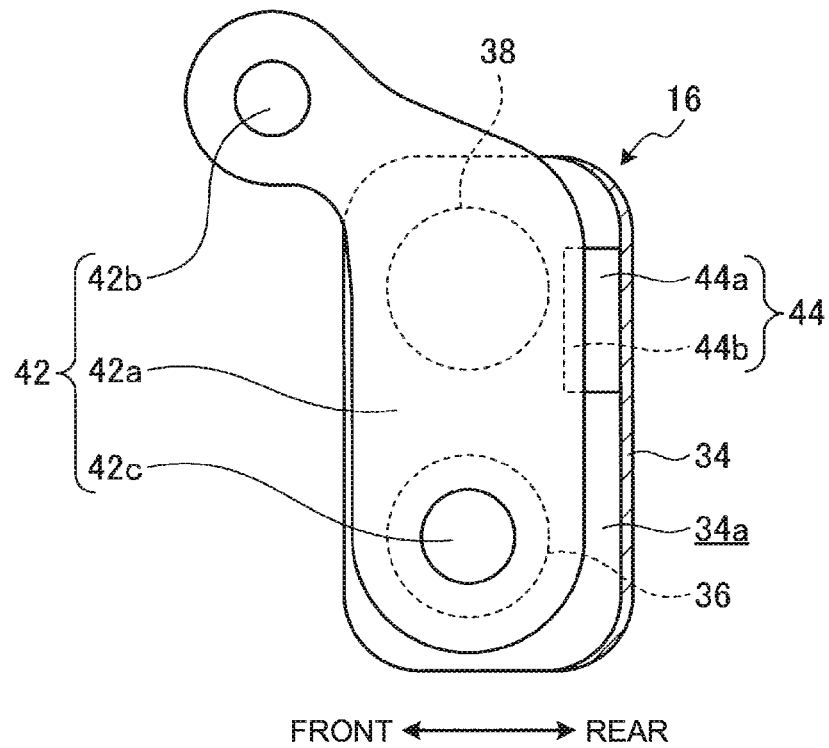
FIG. 6A is a side sectional view illustrating a state of a drive mechanism and the release mechanism in the state illustrated in FIG. 4C.
Figure 6B:
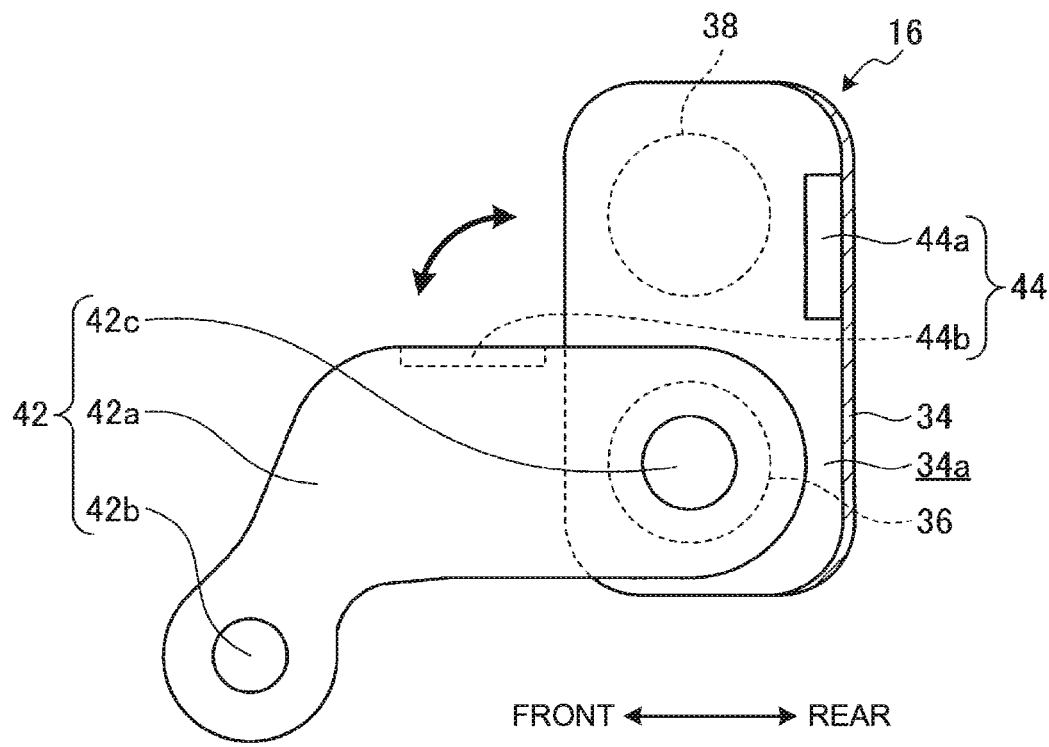
FIG. 6B is a side sectional view illustrating a state of the drive mechanism and the release mechanism in the state illustrated in FIG. 4D.

FIG. 4A is an enlarged perspective view illustrating the hinge mechanism 16 and its peripherals in a state where the hinge chassis 34 is in a 0-degree posture. FIG. 4B is a perspective view illustrating a state where the hinge chassis 34 is turned to a 60-degree posture from the state illustrated in FIG. 4A. FIG. 4C is a perspective view illustrating a state where the movable plate 22 receives the external force F and the release mechanism 44 operates from the state illustrated in FIG. 4B. FIG. 5 is a perspective view illustrating the hinge chassis 34 and its peripherals illustrated in FIG. 4C viewed from another angle. In FIGS. 4A to 5B, the movable plate 22 illustrates only the surrounding frame. FIG. 6A is a side sectional view schematically illustrating a state of the drive mechanism 42 and the release mechanism 44 in the state illustrated in FIG. 4C. FIG. 6B is a side sectional view schematically illustrating a state of the drive mechanism 42 and the release mechanism 44 in the state illustrated in FIG. 4D.

As illustrated in FIGS. 4A to 6B, the drive mechanism 42 is a mechanism that turns the movable plate 22 in conjunction with the turning operation of the display chassis 14 by the hinge mechanism 16, specifically, the turning operation of the hinge chassis 34. The drive mechanism 42 includes an arm member 42*a*, a drive shaft 42*b*, and a turning shaft 42*c*, in the present embodiment, the drive mechanisms 42 and the release mechanisms 44 are configured to be respectively provided in the left and right hinge mechanisms 16 (see FIG. 3), but the drive mechanism 42 and the release mechanism 44 may be provided in only one of the left and right hinge mechanisms 16. The hinge mechanisms 16, the drive mechanisms 42, and the release mechanisms 44 may be provided at three places or more. The hinge mechanism 16 may be configured of the one long hinge chassis 34 extending left and right. In this case, the drive mechanism 42 and the release mechanism 44 may be provided at appropriate places on the hinge chassis 34.

The arm member 42*a* is a bar-shaped member that is arranged along the up-and-down direction in the state illustrated in FIG. 4B. In the state illustrated in FIG. 4B, the arm member 42*a* is housed in a recessed housing part 34*a* formed on the front surface of the hinge chassis 34, and its head end (top end) is protruding upward from the housing part 34*a*. A base end (bottom end) of the arm member 42*a* is connected to the hinge chassis 34 via the turning shaft 42*c* within the housing part 34*a*. The housing part 34*a* has a shape that can house great portion excluding the head end of the arm member 42*a*. The head end of the arm member 42*a* is slightly forward inclined in the state illustrated in FIG. 4B, and is connected to the movable plate 22 via the drive shaft 42*b*.

The drive shaft 42*b* is a shaft that relatively rotatably connects the head end of the arm member 42*a* and the rear end 22*c* of the movable plate 22. The display shaft 38 is arranged at a position between the drive shaft 42*b* and the main body shaft 36. A straight line sequentially linking the shaft centers of the shafts 36, 38, and 42*b* substantially forms a boomerang shape.

The turning shaft 42*c* is a shaft that relatively rotatably connects the base end of the arm member 42*a* and the hinge chassis 34. The turning shaft 42*c* is installed in the housing part 34*a* (see FIG. 5). The turning shaft 42*c* is arranged coaxially with the main body shaft 36 (see FIGS. 6A and 6B).

Therefore, the arm member 42*a* is relatively rotatable coaxially with the hinge chassis 34 by using the turning shaft 42*c* as the center of turning. At a maximum turning position (see FIGS. 4B and 6A) at which the arm member moves toward the hinge chassis 34 at a maximum, the great portion of the arm member 42*a* is housed in the housing part 34*a* to form an appearance that is substantially integral with the hinge chassis 34. At a minimum turning position (see FIGS. 4C, 5, and 6B) at which the arm member relatively moves in a direction away from the hinge chassis 34 at a maximum, the arm member 42*a* is at the same position as in a 0-degree posture.

As illustrated in FIG. 5 to 6B, the release mechanism 44 is a mechanism that releases an interlocking state of the movable plate 22 and the hinge chassis 34 by the drive mechanism 42 depending on the situation. The release mechanism 44 has holding members 44*a* and 44*b* (see FIG. 5).

The holding member 44a is a magnet or a member (adsorbed body), which can be adsorbed to a magnet such as an iron plate, provided on the front inner surface of the housing part 34a. The holding member 44b is a magnet or an adsorbed body provided on the back surface of the arm member 42a. The holding members 44a and 44b can be adsorbed to each other. For this reason, at least one of the holding members 44a and 44b needs to be a magnet.

In normal time when the external force F (see FIG. 2D) is not applied to the movable plate 22, the holding members 44a and 44b are adsorbed to each other (see FIG. 6A). For this reason, the arm member 42a turns integrally with the hinge chassis 34 in a state where the arm member is housed in the housing part 34a of the hinge chassis 34. In other words, the holding members 44a and 44b substantially also function as a part of the drive mechanism 42 for interlocking the turning of the arm member 42a and the turning of the hinge chassis 34.

On the other hand, in an emergency when the external force F is applied to the movable plate 22 in a state where the hinge chassis 34 is turned at an angle (see FIGS. 2B and 2C) greater than the 0-degree posture, the adsorbed state of the holding members 44a and 44b is released. For this reason, the arm member 42a turns in a direction away from the hinge chassis 34 around the turning shaft 42c. In other words, the arm member 42a rotates relatively leaving the hinge chassis 34 and falls forward (see FIG. 6B). As a result, when the external force F is applied to the movable plate 22, the release mechanism 44 releases the interlocking state of the movable plate 22 and the hinge chassis 34 by the drive mechanism 42.

Next, an operation of the electronic apparatus 10 according to the present embodiment will be explained.

First, at the 0-degree position at which the display chassis 14 is closed on the top surface 12a of the main body chassis 12, the main body shaft 36 and the display shaft 38 are arranged in the front-and-rear direction and the hinge chassis 34 has a sideways 0-degree posture, as illustrated in FIG. 2A. In this state, the arm member 42a is housed in the housing part 34a of the hinge chassis 34, and is integrated with the hinge chassis 34 under the adsorption action of the holding members 44a and 44b. For this reason, because the arm member 42a looks substantially integrated with the hinge chassis 34, the deterioration of appearance quality, can be suppressed. In this case, the drive shaft 42b at the head of the arm member 42a is located in the recessed portion for storage 28. The connecting shaft 40a is at the most forward position within the slide support 40b. For this reason, the movable plate 22 is stored in the recessed portion for storage 28 in a horizontal posture along the front-and-rear direction, and does not disrupt a closing operation of the display chassis 14. Therefore, the electronic apparatus 10 forms a thin plate shape formed substantially flush from the top surface 29a of the extension portion 29 to the back surface (herein, top surface) of the display chassis 14.

When the display chassis 14 is turned from the 0-degree position to an opening direction, the hinge chassis 34 turns at a turning angle that is the half of the turning angle of the display chassis 14. In this case, the hinge chassis 34 turns by using the main body shaft 36 as the center of turning. The arm member 42a turns integrally with the hinge chassis 34 around the turning shaft 42c coaxial with the main body shaft 36. Therefore, the drive shaft 42b swivels around the main body shaft 36 (the turning shaft 42c) to pull up the rear end 22c of the movable plate 22 upward and further pull the rear end backward.

When the display chassis 14 reaches the 90-degree position illustrated in FIG. 2B, the hinge chassis 34 and the arm member 42a have a 45-degree posture that faces diagonally, upward and forward from the main body shaft 36. Therefore, the movable plate 22 has a front-down tilted posture in which the rear end 22c moves upward around the connecting shaft 40a of the front end 22b (see FIG. 2B).

When the display chassis 14 is further turned from the 90-degree position to the opening direction, the hinge chassis 34 and the arm member 42a also turn in a direction of further raising the display shaft 38. For example, when the display chassis 14 is set to about 120 degrees that is an angular position when using a general laptop PC, the movable plate 22 has the rear end 22c that is raised further than the 90-degree position and the movable plate 22 is simultaneously moved further backward.

When the display chassis 14 reaches the 180-degree position illustrated in FIG. 2C, the hinge chassis 34 and the arm member 42a have a 90-degree posture with the main body shaft 36 as the center of turning. For this reason, the movable plate 22 has the rear end 22c that is raised most and the movable plate 22 is slid most backward.

As described above, because the electronic apparatus 10 includes the drive mechanisms 42, the movable plate 22 turns in conjunction with the turning operation of the display chassis 14. In other words, in the electronic apparatus 10, the movable plate 22 is automatically opened in a front-down tilted posture when a user opens the display chassis 14 up to a desired angular position at the time of its use. For this reason, while using the keyboard 20, the user can favorably visually recognize the sub display 24 at the rear of the keyboard 20 and can favorably perform a touch operation (also see FIG. 1). Furthermore, the ventilation port 26 is opened in this state. For this reason, the blower fan 30 can efficiently take in outside air from the ventilation port 26 and thus the cooling efficiency of the electronic apparatus 10 is improved. In this case, because the ventilation port 26 is at the backside of the movable plate 22, the ventilation port 26 is hardly visually recognized by the user who uses the electronic apparatus 10 (see FIG. 1) and thus an appearance quality is not impaired. Moreover, the movable plate 22 slides gradually backward along with the turning to the opening direction. For this reason, even if the movable plate 22 is opened, a gap between the rear end 22c of the movable plate 22 and the front surface of the display chassis 14 is not expanded and thus the deterioration of appearance quality can be further suppressed.

Moreover, the electronic apparatus 10 includes the release mechanisms 44 of which each releases an interlocking state of the hinge chassis 34 and the movable plate 22 by the drive mechanisms 42. For this reason, when the movable plate 22 temporarily receives a force not less than the predetermined external force F in a downward direction in the state where the display chassis 14 is opened as illustrated in FIGS. 2B and 2C, the release mechanisms 44 operate to release the interlocking state of the hinge chassis 34 and the movable plate 22 and the movable plate 22 is allowed to descend. For this reason, as illustrated in FIG. 2D, only the arm member 42a turns forward and falls down, leaving the hinge chassis 34, to lower the movable plate 22. As a result, it is possible to suppress the movable plate 22, the hinge mechanisms 16, the drive mechanisms 42, and the like from being damaged or having troubles due to an excessive load applied to them by the external force F. Because the release mechanisms 44 are configured to use adsorption power by magnet, the configuration is simple and can be realized at low cost.

The hinge mechanisms 16 and the drive mechanisms 42 according to the present embodiment turn the hinge chassis 34 at a turning angle that is the half of the turning angle of the display chassis 14 and raise the movable plate 22 by using the turning operation of the hinge chassis 34. In other words, the electronic apparatus 10 includes a time difference mechanism in which, when the turning operation of the display chassis 14 starts, the movable plate 22 turns while being delayed in this turning operation. As a result, the movable plate 22 is suppressed from being raised at a large turning angle before the display chassis 14 rises and the rear end 22c of the movable plate 22 is suppressed from interfering with the display chassis 14, and thus the turning operation of the display chassis 14 can be performed smoothly.

When the display chassis 14 located at the 180-degree position illustrated in FIGS. 2C and 21) is turned in a closing direction, the operation is opposite to the opening operation described above. In other words, as the display chassis 14 is turned in the closing direction, the movable plate 22 moves forward while the rear end 22c is gradually lowered. Then, the movable plate 22 again returns to the initial state illustrated in FIG. 2A at the 0-degree position. In this case, when the display chassis 14 is closed to the 0-degree position from the state illustrated in FIG. 2D, the holding members 44a and 44b are again adsorbed to each other to restore the interlocking state of the hinge chassis 34 and the movable plate 22 by the drive mechanisms 42. For this reason, because the drive mechanisms 42 can be again returned by once closing only the display chassis 14 when the release mechanisms 44 operate, the user can obtain high convenience.

Figure 7A:
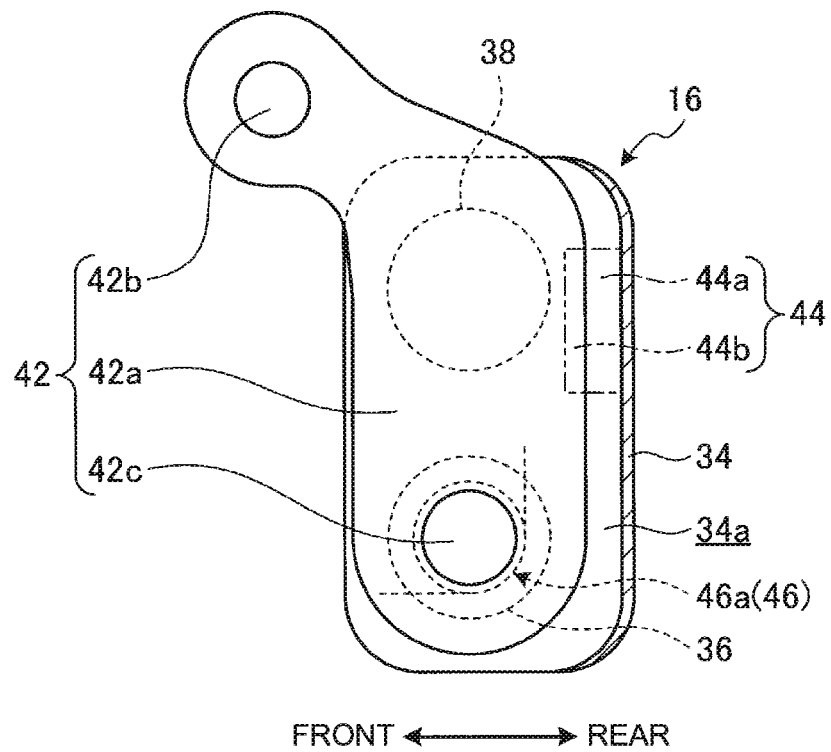
FIG. 7A is a side sectional view illustrating a configuration of a release mechanism according to a first modified example.
Figure 7B:
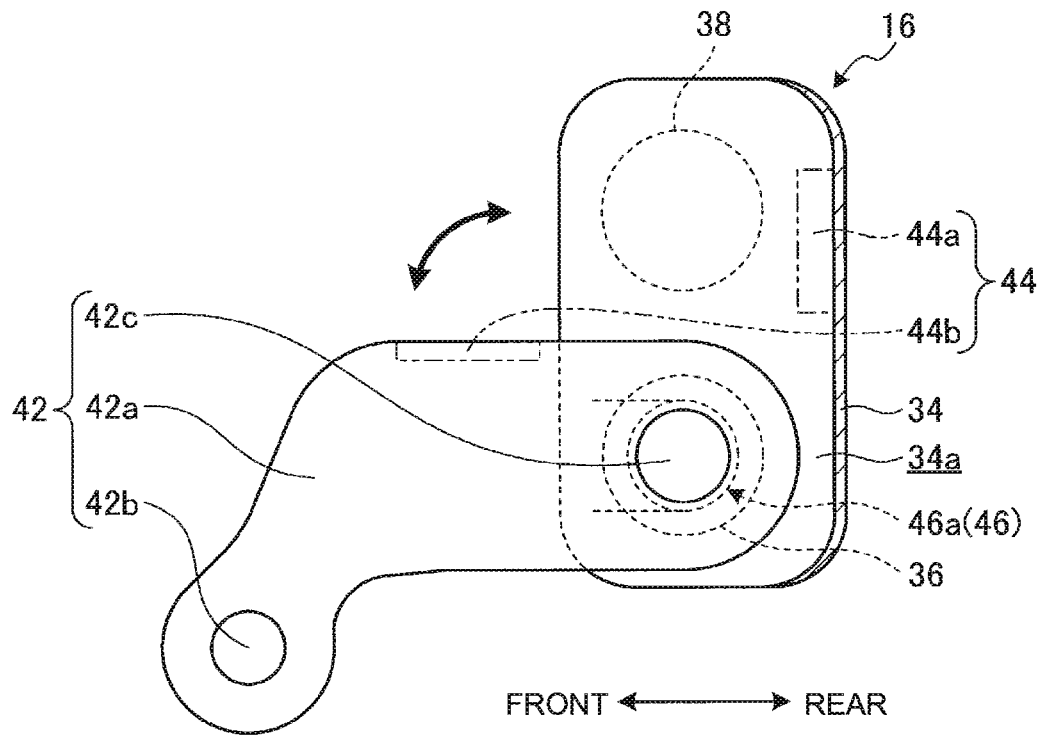
FIG. 7B is a side sectional view illustrating a state where the release mechanism operates to release an interlocking state of the hinge chassis and the movable plate and only the movable plate is lowered from the state illustrated in FIG. 7A.

FIG. 7A is a side sectional view schematically illustrating a configuration of a release mechanism 46 according to the first modified example, and illustrates a state of the drive mechanism 42 and the release mechanism 46 in a state where the hinge chassis 34 is in the 90-degree posture. FIG. 7B is a side sectional view illustrating a state where the release mechanism 46 operates from the state illustrated in FIG. 7A to release an interlocking state of the hinge chassis 34 and the movable plate 22 and only the movable plate 22 is lowered.

As illustrated in FIGS. 7A and 7B, the release mechanism 46 includes an elastic member for biasing the arm member 42a toward a maximum turning position as a holding member in behalf of the holding members 44a and 44b. The elastic member according to the first modified example is a torsion coil spring 46a provided around the axis of the turning shaft 42c, for example. The elastic member may use a coil spring etc. instead of the torsion coil spring 46a.

As described above, the release mechanism 46 constantly biases the arm member 42a up to a position at which the arm member is housed in the housing part 34a. For this reason, when the display chassis 14 turns in the opening direction from the 0-degree position illustrated in FIG. 2A, the arm member 42a also turns integrally with the hinge chassis 34 due to the biasing force of the torsion coil spring 46a. In other words, the torsion coil spring 46a also substantially functions as a part of the drive mechanism 42 that interlocks the turning of the arm member 42a and the turning of the hinge chassis 34. Then, as illustrated in FIG. 2D, when the movable plate 22 receives the external force F, the arm member 42a turns forward against the biasing force of the torsion coil spring 46a. In other words, the interlocking state of the hinge chassis 34 and the movable plate 22 by the drive mechanism 42 is released by the release mechanism 46. In this configuration example, if the external force F with respect to the movable plate 22 is released, the arm member 42a is again housed in the housing part 34a of the hinge chassis 34 to restore the interlocking state by the drive mechanism 42 due to the biasing force of the torsion coil spring 46a.

The release mechanism 46 may be used together with the release mechanism 44 described above as illustrated by the two-dot chain line in FIGS. 7A and 7B. By doing so, the arm member 42a is adsorbed and fixed to the hinge chassis 34 by the action of the release mechanism 44 in normal time. For this reason, when a touch operation is performed on the sub display 24 in normal time, for example, the movable plate 22 can be more surely prevented from rattling up and down. Moreover, if the external force F with respect to the movable plate 22 is released after the release mechanisms 44 and 46 operate, the arm member 42a is again housed in the housing part 34a of the hinge chassis 34 and the holding members 44a and 44b are also adsorbed to each other.

Figure 8A:
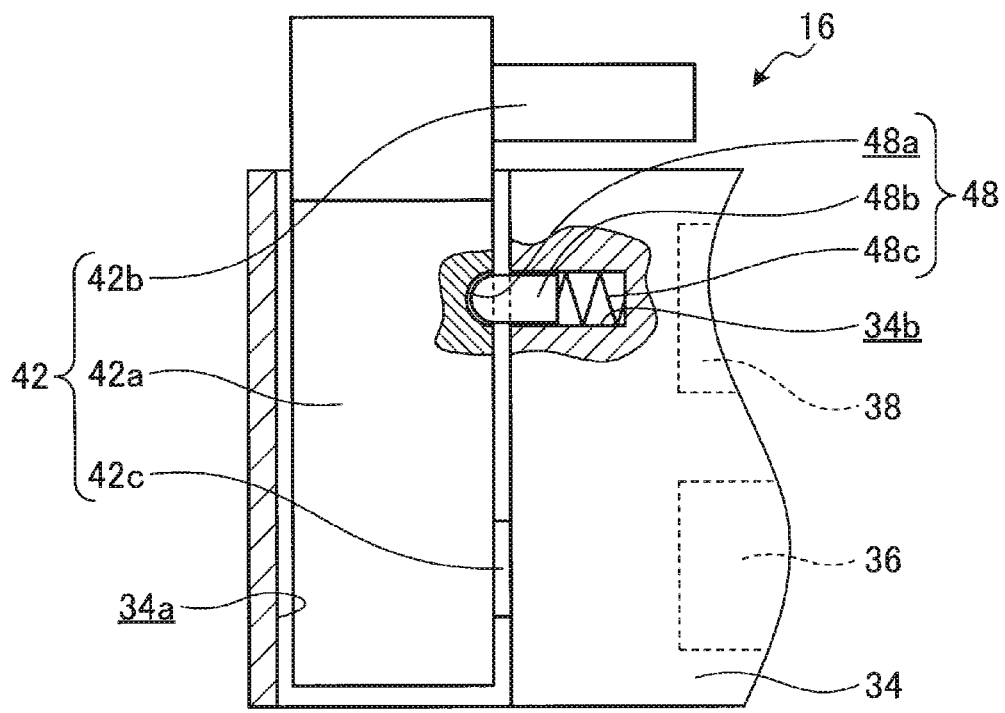
FIG. 8A is a side sectional view illustrating a configuration of a release mechanism, according to a second modified example.
Figure 8B:
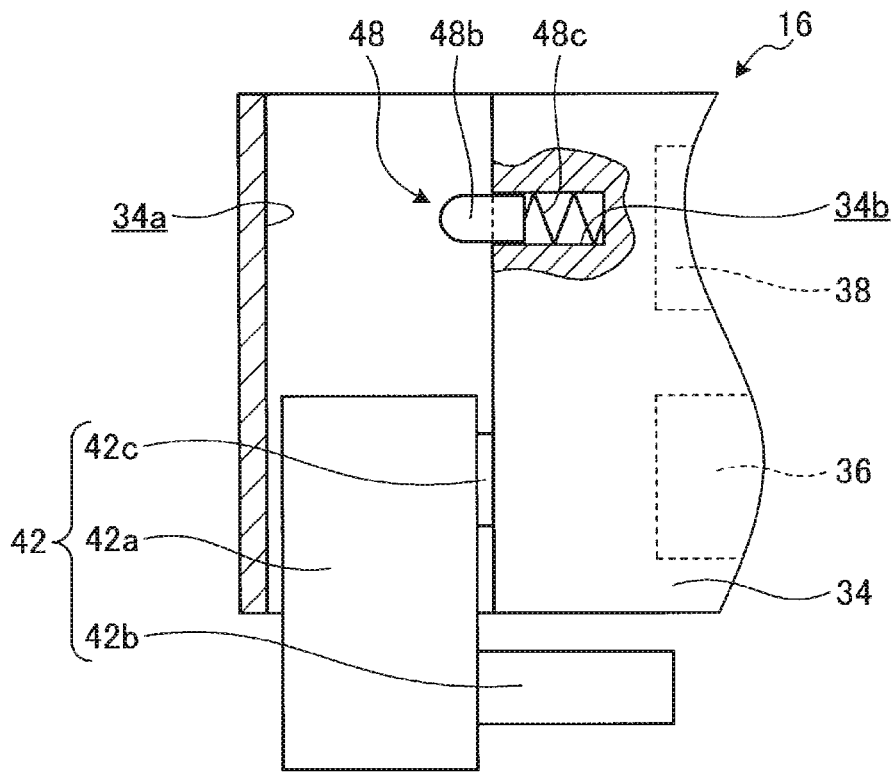
FIG. 8B is a side sectional view illustrating a state where the release mechanism operates to release an interlocking state of the hinge chassis and the movable plate and only the movable plate is lowered from the state illustrated in FIG. 8A.

FIG. 8A is a side sectional view schematically illustrating a configuration of a release mechanism 48 according to the second modified example, and illustrates a state of the drive mechanism 42 and the release mechanism 48 in a state where the hinge chassis 34 is in the 90-degree posture. FIG. 8B is a side sectional view illustrating a state where the release mechanism 48 operates from the state illustrated in FIG. 8A to release an interlocking state of the hinge chassis 34 and the movable plate 22 and only the movable plate 22 is lowered.

As illustrated in FIGS. 8A and 8B, the release mechanism 48 includes a recessed portion for engagement 48a, an engagement pin 48h, and a coil spring 48c. The recessed portion for engagement 48a is a hemispherical recessed portion provided on the side surface of the arm member 42a. The engagement pin 48b is provided to be retractable from a hole 34b opened on the inner side surface of the housing part 34a of the hinge chassis 34. The head of the engagement pin 48b is hemispheric and can be engaged with the recessed portion for engagement 48a. The base of the engagement pin 48b is located in the hole 34b and is always biased by the coil spring 48c in a direction of protruding from the hole 34b.

As described above, the release mechanism 48 mechanically realizes the fixing of the arm member 42a and the hinge chassis 34 by the release mechanism 46 of using the adsorption power of magnet, by using an engaging action between the engagement pin 48b and the recessed portion for engagement 48a. For this reason, the recessed portion for engagement 48a, the engagement pin 48b, and the like function as holding members in behalf of the holding members 44a and 44b. In other words, the recessed portion for engagement 48a, the engagement pin 48b, and the like also substantially function as a part of the drive mechanism 42 that interlocks the turning of the arm member 42a and the turning of the hinge chassis 34.

Therefore, in the release mechanism 48, the engagement pin 48b engages with the recessed portion for engagement 48a in normal time and the arm member 42a is integrally fixed to the hinge chassis 34. Then, as illustrated in FIG. 2D, because the engagement pin 48b retreats and an engagement state between the engagement pin 48b and the recessed portion for engagement 48a comes off when the movable plate 22 receives the external force F, the arm member 42a turns forward. As a result, the interlocking state of the hinge chassis 34 and the movable plate 22 by the drive mechanism 42 is released by the release mechanism 46. In this configuration example, because the engagement pin 48b again engages with the recessed portion for engagement 48a when the display chassis 14 is closed to the 0-degree position from the state illustrated in FIG. 2D, the interlocking state of the hinge chassis 34 and the movable plate 22 by the drive mechanism 42 is restored.

The fixing of the arm member 42a and the hinge chassis 34 may be configured by a mechanical means other than the configuration of using the engaging action between the engagement pin 48b and the recessed portion for engagement 48a. For example, the mechanical means may utilize a release mechanism in which a claw-shaped latch is provided on the head side of the arm member 42a and a receiving part that can be engaged with and disengaged from this latch is provided on the hinge chassis 34 side.

In addition, the present invention is not limited to the embodiments as described above, and the embodiments can be freely changed without departing from the scope of the present invention.

As above, there has been illustrated the hinge mechanisms 16 having a bi-axial structure, but the embodiment may use the hinge mechanisms having a uniaxial structure. In the case of the hinge mechanisms having a uniaxial structure, the drive mechanism 42, the release mechanism 44, and the like may be provided around the main body shaft 36 by omitting the display shaft 38 and integrally configuring the hinge chassis 34 and the display chassis 14, for example. Moreover, in the case of the hinge mechanisms having a uniaxial structure, the drive mechanism 42, the release mechanism 44, and the like may be provided around the display shaft 38 by omitting the main body shaft 36 and integrally configuring the hinge chassis 34 and the main body chassis 12, for example.

As above, there has been illustrated the hinge mechanisms 16 in which two shafts (the main body shaft 36 and the display shaft 38) are synchronously rotated. However, the hinge mechanisms 16 may be configured to selectively rotate one of the main body shaft 36 and the display shaft 38 in accordance with the turning angle of the display chassis 14, for example. With this configuration, the hinge mechanism 16 may include a turning shaft selection mechanism in which one of the main body shaft 36 and the display shaft 38 selectively rotates for each turning angle range of the display chassis 14, for example. A well-known configuration disclosed in Japanese Patent No. 5986156 can be applied to the turning shaft selection mechanism, for example. In the hinge mechanism 16 including the rotating shaft selection mechanism, only the display shaft 38 rotates while the display chassis 14 is located between a 0-degree position and a 30-degree position and between a 120-degree position and a 180-degree position, for example. On the other hand, only the main body shaft 36 rotates while the display chassis 14 is located between the 30-degree position and the 120-degree position, for example, and thus the movable plate 22 is moved up and down.

As above, it has been illustrated that the movable plate 22 includes the sub display 24, but the sub display 24 may not be provided. In this case, the movable plate 22 functions as an opening lid of the ventilation port 26. Moreover, the ventilation port 26 may be omitted. In this case, the movable plate 22 functions as a support plate of the sub display 24.

As has been described, the present invention provides an electronic apparatus having a sub display.

While the invention has been particularly shown and described with reference to a preferred embodiment, it will be understood by those skilled in the art that various changes in form and detail may be made therein without departing from the spirit and scope of the invention.

What is claimed is:

1. An electronic apparatus comprising:
a first chassis having a keyboard device;
a second chassis having a display;
a movable plate disposed between said first and second chassis;
a hinge mechanism having a hinge chassis that connects said first chassis, said second chassis, and said movable plate to each other, wherein said hinge mechanism includes
a drive mechanism that turns said movable plate in conjunction with a turning operation between said first chassis and said second chassis by said hinge mechanism; and
a release mechanism that releases an interlocking state of said turning operation and said movable plate by said drive mechanism to allow said movable plate to turn in a downward direction when said movable plate of which a rear end is located at a raised position receives a predetermined external force in said downward direction.

2. The electronic apparatus of claim 1, wherein said hinge mechanism includes
a hinge chassis provided to extend between said first chassis and said second chassis; and
a first hinge shaft that relatively rotatably connects said first chassis and said hinge chassis.

3. The electronic apparatus of claim 1, wherein said drive mechanism includes
a turning shaft provided coaxially with a first hinge shaft;
an arm member of which one end is turnably connected to a hinge chassis via said turning shaft; and
a drive shaft that relatively rotatably connects another end of said arm member and said rear end of said movable plate.

4. The electronic apparatus of claim 3, wherein said hinge chassis includes a housing part that retractably houses said arm member, and said arm member is housed in said housing part at said maximum turning position.

5. An electronic apparatus, comprising:
a first chassis;
a second chassis;
a hinge mechanism connecting said first and said second chassis;
a movable plate provided on a top surface of said first chassis, said movable plate being turnable in a direction in which its rear end moves up and down around a rotating shaft part provided at its front end;
a drive mechanism that turns said movable plate in conjunction with a turning operation between said first chassis and said second chassis by said hinge mechanism, wherein said drive mechanism includes
a turning shaft provided coaxially with a first hinge shaft;
an arm member of which one end is turnably connected to an hinge chassis via said turning shaft; and
a drive shaft that relatively rotatably connects another end of said arm member and said rear end of said movable plate; and
a release mechanism that releases an interlocking state of said turning operation and said movable plate by said drive mechanism to allow said movable plate to turn in a downward direction when said movable plate of which said rear end is located at a raised position receives a predetermined external force in said downward direction.

6. The electronic apparatus of claim 5, wherein said release mechanism includes a holding member that holds and arm member at a maximum turning position at which said other end moves towards said hinge chassis at a maximum and releases a holding state of said arm member at said maximum turning position to allow said arm member to turn in a direction in which said other end is away from said hinge chassis when said movable plate receives said predetermined external force.

7. The electronic apparatus of claim 6, wherein said holding member includes
   a first magnet that is provided in one of said hinge chassis and said arm member; and
   a second magnet or an adsorbed body that is provided in another of said hinge chassis and said arm member and can be adsorbed to said first magnet.

8. The electronic apparatus of claim 6, wherein said holding member includes an elastic member that biases said arm member in a direction in which said arm member is turned towards said maximum turning position.

9. The electronic apparatus of claim 5, wherein said hinge chassis includes a housing part that retractably houses said arm member, and said arm member is housed in said housing part at said maximum turning position.

10. The electronic apparatus of claim 5, wherein said rotating shaft part includes a connecting shaft that relatively rotatably connects said front end of said movable plate and said first chassis; and a slide support that supports said connecting shaft to be slidable along said top surface of said first chassis.

11. The electronic apparatus of claim 5, wherein a display is provided on a top surface of said movable plate.

* * * * *